United States Patent

Jiang et al.

(10) Patent No.: US 8,532,316 B2
(45) Date of Patent: Sep. 10, 2013

(54) FLAT PANEL PIEZOELECTRIC LOUDSPEAKER

(75) Inventors: Kai-Li Jiang, Beijing (CN); Liang Liu, Beijing (CN); Chen Feng, Beijing (CN); Li Qian, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 810 days.

(21) Appl. No.: 12/660,357

(22) Filed: Feb. 25, 2010

(65) Prior Publication Data

US 2010/0296677 A1 Nov. 25, 2010

(30) Foreign Application Priority Data

May 19, 2009 (CN) .......................... 2009 1 0107488

(51) Int. Cl.
- H04R 25/00 (2006.01)
- H01L 41/00 (2013.01)
- H02N 2/00 (2006.01)
- H04R 17/00 (2006.01)
- B82Y 30/00 (2011.01)

(52) U.S. Cl.
CPC ................ H04R 17/00 (2013.01); B82Y 30/00 (2013.01); *Y10S 977/742* (2013.01)
USPC ............ 381/190; 381/337; 310/334; 977/742

(58) Field of Classification Search
CPC .. H04R 17/00; H04R 17/005; H04R 2217/00; B82Y 30/00; H01L 29/0673
USPC ........ 381/190, 337; 310/322, 334; 977/742, 977/902
See application file for complete search history.

(56) References Cited

U.S. PATENT DOCUMENTS

| 6,250,984 | B1 * | 6/2001 | Jin et al. ........................... 445/51 |
| 6,376,971 | B1 | 4/2002 | Pelrine et al. |
| 7,045,108 | B2 * | 5/2006 | Jiang et al. ................. 423/447.2 |
| 8,022,601 | B2 * | 9/2011 | Stollberg ...................... 310/339 |
| 2007/0081681 | A1 | 4/2007 | Yu et al. |
| 2008/0170982 | A1 | 7/2008 | Zhang et al. |
| 2009/0096346 | A1 | 4/2009 | Liu et al. |
| 2009/0102810 | A1 | 4/2009 | Jiang et al. |

(Continued)

FOREIGN PATENT DOCUMENTS

| JP | 58-9822 | 1/1983 |
| JP | 08-325195 | 12/1996 |

(Continued)

OTHER PUBLICATIONS

Li Qunqing, et al. Coating of Carbon Nanotube with Nickel by Electroless Plating Method, Apr. 1997, Japan Journal of Applied Physics, vol. 36, pp. 501-503.*

Primary Examiner — Jesse Elbin
(74) Attorney, Agent, or Firm — Altis Law Group, Inc.

(57) ABSTRACT

A flat panel piezoelectric loudspeaker includes a piezoelectric element, a first electrode and a second electrode. The piezoelectric element includes a first surface and a second surface opposite to the first surface. The first electrode is electrically connected to the piezoelectric element and disposed on the first surface. The second electrode is electrically connected to the piezoelectric element and disposed on the second surface. At least one of the first electrode and the second electrode includes a carbon nanotube structure. The carbon nanotube structure includes a plurality of carbon nanotubes approximately aligned along a same direction.

19 Claims, 7 Drawing Sheets

(56) References Cited

U.S. PATENT DOCUMENTS

| | | |
|---|---|---|
| 2009/0117434 A1 | 5/2009 | Liu et al. |
| 2010/0034411 A1* | 2/2010 | Mellow et al. ............... 381/345 |

FOREIGN PATENT DOCUMENTS

| | | |
|---|---|---|
| JP | 2000-223004 | 8/2000 |
| JP | 2002-110178 | 4/2002 |
| JP | 2003-506858 | 2/2003 |
| JP | 2008-523254 | 7/2008 |
| JP | 2008-215993 | 9/2008 |
| TW | 200901807 | 1/2009 |
| WO | WO0106579 | 1/2001 |
| WO | WO2008111728 | 9/2008 |

* cited by examiner

FLAT PANEL PIEZOELECTRIC LOUDSPEAKER

CROSS-REFERENCE TO RELATED APPLICATIONS

This application claims all benefits accruing under 35 U.S.C. §119 from China Patent Application No. 200910107488.7, filed on May 19, 2009, in the China Intellectual Property Office.

BACKGROUND

1. Technical Field

The present disclosure relates to flat panel loudspeakers, and particularly, to a flat panel piezoelectric loudspeaker (hereinafter, "FPPL").

2. Description of Related Art

The operating principle of FPPLs is based on a converse piezoelectric effect of some piezoelectric material. Namely, when an alternating electric field is applied to the piezoelectric material, the piezoelectric material can be correspondingly and mechanically distorted, thereby triggering sound producing vibration of ambient air.

Currently, the basic structure of the FPPL includes a piezoelectric element, a first electrode, and a second electrode. The first electrode and the second electrode are electrically connected to the piezoelectric element, and spaced apart. Conventionally, the first electrode and the second electrode are fabricatable via printing metal film on the piezoelectric element, to electrically connect with the piezoelectric element seamlessly. During operation of the FPPL, the piezoelectric element is mechanically and repeatedly bent or distorted. However, the first electrode and the second electrode consist of metal, and have a poor anti-fatigue performance due to a fatigue fracture derived from the distortion of the piezoelectric element.

For achieving a transparent FPPL, the first electrode and the second electrode can consist of indium tin oxide (ITO) layer which has poor flexibility and anti-fatigue performance and thus is easily breakable because of the fatigue fracture. Moreover, because the ITO layer can only be deposited on a surface of the piezoelectric element under high temperatures, the piezoelectric performance of the piezoelectric element may be adversely affected by the ITO layer deposit process.

Carbon nanotube films can be used as electrodes of a conventional transparent FPPL. The method of forming the carbon nanotube film on the piezoelectric element includes coating the liquid solution comprising carbon nanotubes on two surfaces of the piezoelectric element, and vaporizing solvent in the liquid solution under a temperature in a range from 50 degrees to 70 degrees. In this method, the carbon nanotube film is formed on the piezoelectric element under a low temperature, and the piezoelectric performance would not decline under this low temperature. However, the carbon nanotubes in the carbon nanotube film are disorderly arranged, thus, the conductive property of the carbon nanotubes cannot be applied adequately, thereby slowing the response speed of the flat panel loudspeaker.

What is needed, therefore, is an improved FPPL having a fast response.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
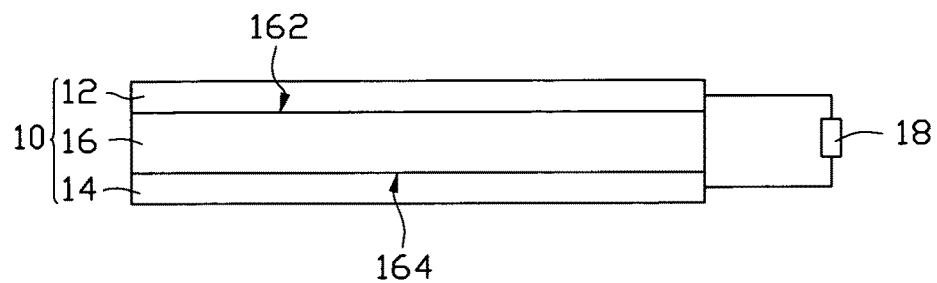
FIG. 1 is a structural schematic view of one embodiment of a FPPL.

Referring to FIG. 1, one embodiment of a FPPL 10 includes a piezoelectric element 16, a first electrode 12, and a second electrode 14. The piezoelectric element 16 includes a first surface 162 and a second surface 164 opposite to the first surface 162. The first electrode 12 is electrically connected to the piezoelectric element 16, and disposed on the first surface 162. The second electrode 14 is electrically connected to the piezoelectric element 16 and disposed on the second surface 164.

The piezoelectric element 16 can consist of piezoelectric crystal, piezoelectric ceramics, piezozlectric semiconductor, and macromolecule piezoelectric material. The piezoelectric crystal can be lithium niobate ($LiNbO_3$), lithium tantalate ($LiTaO_3$), lithium germanium oxide ($LiGeO_3$), lithium gallate ($LiGaO_3$) or bismuth germanium oxide ($Bi_{12}GeO_{20}$). The piezoelectric ceramics can be barium titanate ($BaTiO_3$), lead zirconate titanate (PZT), niobate piezoelectric ceramics, or lead magnesium niobate piezoelectric ceramics. The piezozlectric semiconductor can be zinc zulfide (ZnS), cadmium telluride (CdTe), zinc oxide (ZnO), cadmium sulfide (CdS), zinc telluride (ZnTe), or gallium arsenide (GaAs). The macromolecule piezoelectric material can be polyvinylidene fluoride (PVDF), polyvinyl fluoride (PVF), or polyvinyl chloride (PVC). The thickness of the piezoelectric element 16 can be set as desired.

At least one of the first electrode 12 and the second electrode 14 can be a carbon nanotube structure. The carbon nanotube structure includes a plurality of carbon nanotubes approximately aligned along a same direction. The carbon nanotubes in the carbon nanotube structure may be uniformly distributed. Further, the carbon nanotubes in the first electrode 12 can be substantially parallel to the first surface 162 of the piezoelectric element 16. The carbon nanotubes in the second electrode 14 can be substantially parallel to the second surface 164 of the piezoelectric element 16. The carbon nanotubes can be single-walled, double-walled, or multi-walled carbon nanotubes. A diameter of each single-walled carbon nanotube ranges from about 0.5 nanometers (nm) to about 50 nm. A diameter of each double-walled carbon nanotube ranges from about 1 nm to about 50 nm. A diameter of each multi-walled carbon nanotube ranges from about 1.5 nm to about 50 nm. In one embodiment, the carbon nanotube structure only comprises carbon nanotubes. In the other embodiment, the carbon nanotube structure can further comprise metal film deposited on the surface of the carbon nanotubes.

The carbon nanotube structure can include at least one carbon nanotube film. The carbon nanotube film can be, but is not limited to the films described as follow.

Drawn Carbon Nanotube Film

In one embodiment, the carbon nanotube film can be drawn from a carbon nanotube array, to form a drawn carbon nanotube film. The drawn carbon nanotube film can be pulled out from a super-aligned carbon nanotube array on a substrate. The drawn carbon nanotube film includes a plurality of carbon nanotubes that are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals attractive force. A small number of the carbon nanotubes are randomly arranged in the drawn carbon nanotube film, and has a small if not negligible effect on the larger number of the carbon nanotubes in the drawn carbon nanotube film arranged substantially along the same direction. The carbon nanotube film is capable of forming a freestanding structure. The term "free-standing structure" includes, but is not limited to, a structure that does not have to be supported by a substrate. For example, a freestanding structure can sustain the weight of itself when it is hoisted by a portion thereof without any significant damage to its structural integrity. So, if the drawn carbon nanotube film is placed between two separate supporters, a portion of the drawn carbon nanotube film, not in contact with the two supporters, would be suspended between the two supporters and yet maintain film structural integrity. The freestanding structure of the drawn carbon nanotube film is realized by the successive carbon nanotubes joined end to end by van der Waals attractive force.

Figure 3:
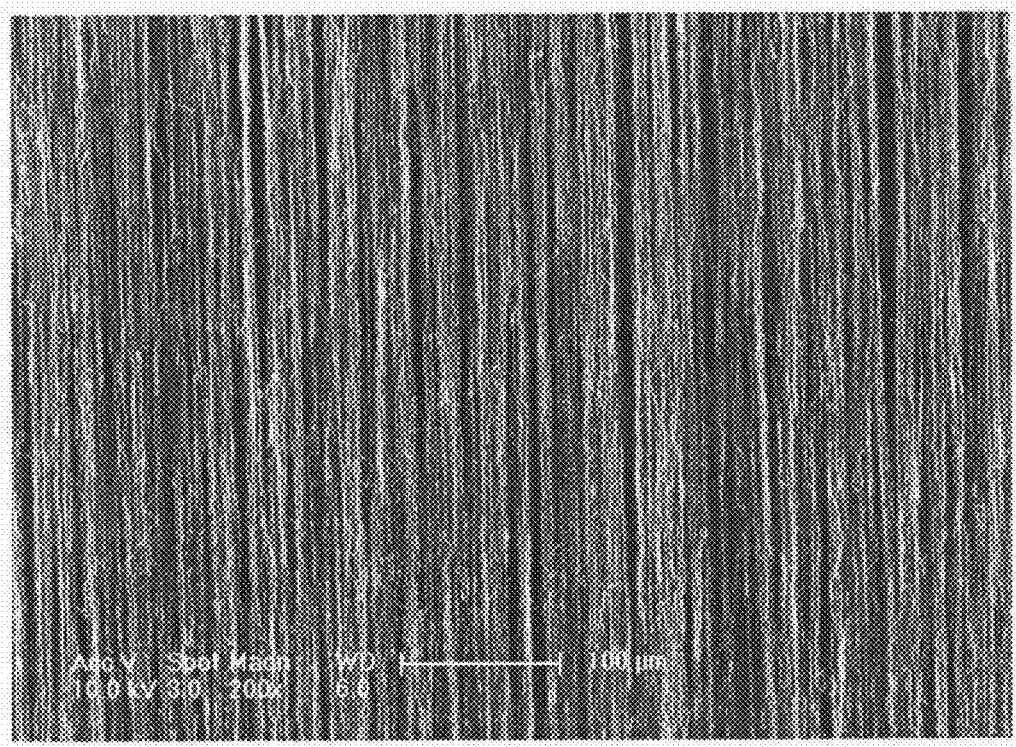
FIG. 3 is a Scanning Electron Microscope (SEM) image of the drawn carbon nanotube film used in the FPPL of FIG. 1.

It can be appreciated that some variation can occur in the orientation of the carbon nanotubes in the drawn carbon nanotube film as can be seen in FIG. 3. Microscopically, the carbon nanotubes oriented substantially along the same direction may not be perfectly aligned in a straight line, and some curve portions may exist. It can be understood that a contact between some carbon nanotubes located substantially side by side and oriented along the same direction can not be totally excluded.

Figure 2:
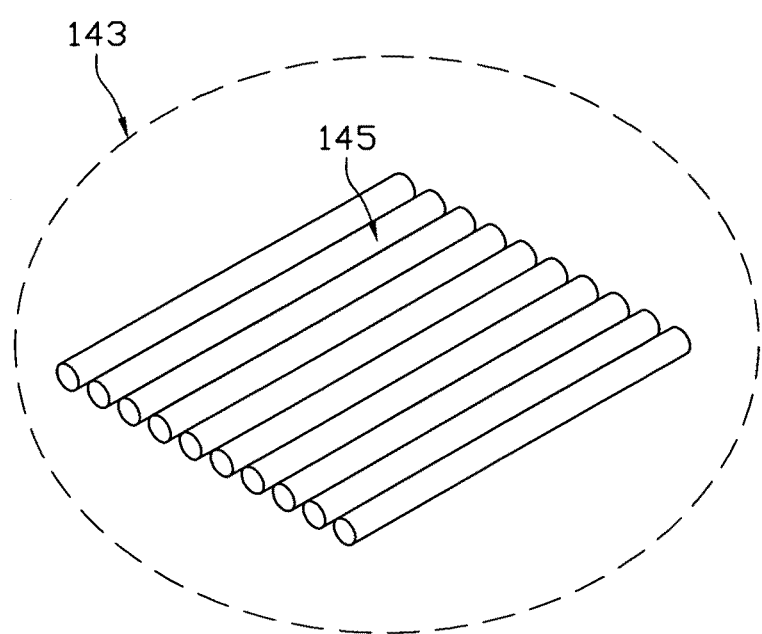
FIG. 2 is a structural schematic view of a carbon nanotube segment of a drawn carbon nanotube film used in the FPPL of FIG. 1.

More specifically, referring to FIG. 2, the drawn carbon nanotube film can include a plurality of successively oriented carbon nanotube segments 143 joined end-to-end by van der Waals attractive force therebetween. Each carbon nanotube segment 143 includes a plurality of carbon nanotubes 145 substantially parallel to each other, and joined by van der Waals attractive force therebetween. The carbon nanotube segments 143 can vary in width, thickness, uniformity and shape. The carbon nanotubes 145 in the drawn carbon nanotube film 143 are also substantially oriented along a preferred orientation.

The thickness of the drawn carbon nanotube film is in a range from about 0.5 nm to about 100 micrometers (μm). Examples of a drawn carbon nanotube film is taught by U.S. Pat. No. 7,045,108 to Jiang et al., and WO 2007015710 to Zhang et al.

Carbon Nanotube Segment Film

In another embodiment, the carbon nanotube film can be a carbon nanotube segment film. The carbon nanotube segment film comprises of one carbon nanotube segment. The carbon nanotube segment film includes a plurality of carbon nanotubes substantially arranged along a same direction. The carbon nanotubes in the carbon nanotube segment film are substantially parallel to each other and have almost equal lengths, and are combined side by side via van der Waals attractive force therebetween. The width of the carbon nanotube segment film is equal to the length of the carbon nanotubes, thus at least one carbon nanotube spans the entire width of the carbon nanotube segment film.

The carbon nanotube segment film can be produced by growing a strip-shaped carbon nanotube array, and pushing the strip-shaped carbon nanotube array down along a direction substantially perpendicular to a length of the strip-shaped carbon nanotube array, and has a length of about 20 μm to about 10 millimeters (mm). The length of the strip only limits the length of the carbon nanotube segment film. A larger carbon nanotube segment film can also be formed by having a plurality of the strips lined up side by side and folding the carbon nanotubes grown thereon over such that there is overlap between the carbon nanotubes on adjacent strips.

In some embodiments, the carbon nanotube segment film comprising one carbon nanotube segment can also be produced by a method adopting a "kite-mechanism." The carbon nanotube segment film can have carbon nanotubes with a length greater than 10 centimeters (cm). Specifically, the carbon nanotube segment film can be produced by providing a growing substrate with a catalyst layer located thereon, placing the growing substrate adjacent to the insulating substrate in a chamber, heating the chamber to a growth temperature for carbon nanotubes under a protective gas, introducing a carbon source gas along a gas flow direction, and growing a plurality of carbon nanotubes on the insulating substrate. After introducing the carbon source gas into the chamber, the carbon nanotubes will start to grow under the effect of the catalyst. One end (e.g., the root) of the carbon nanotubes is fixed on the growing substrate, and the other end (e.g., the top/free end) of the carbon nanotubes will grow continuously. The growing substrate is near an inlet of the introduced carbon source gas, such that the carbon nanotubes float above the insulating substrate with the roots of the carbon nanotubes still attached on the growing substrate, as the carbon source gas is continuously introduced into the chamber. The length of the carbon nanotubes depends on the growth conditions. After growth has been stopped, the carbon nanotubes are disposed entirely on the insulating substrate. The roots of carbon nanotubes are then separated from the growing substrate. This can be repeated many times to obtain many layers of carbon nanotube segment films on a single insulating substrate. The adjacent carbon nanotubes can be adhered together by van der Waals attractive force therebetween and be substantially parallel to each other, with a distance of adjacent carbon nanotubes being less than 5 μm.

The carbon nanotube structure can include at least two stacked and/or coplanar carbon nanotube films, thereby forming carbon nanotube structures having different areas or different thicknesses. These coplanar carbon nanotube films can also be stacked one upon other films. The arrangement direction of the carbon nanotubes in two adjacent carbon nanotube films can be same or different. Adjacent carbon nanotube films can be combined only by the van der Waals attractive force therebetween. The number of layers of the carbon nanotube films is not limited, so that a carbon nanotube structure can have different thicknesses and areas. Stacking the carbon nanotube films will add to the structural strength of the carbon nanotube structure.

Contingent upon durability, the thickness of the carbon nanotube structure can be chosen based on demand. In one embodiment, the thickness of the carbon nanotube structure can be in a range of about 0.5 nm to about 1 mm. The carbon nanotube structure has high transparency if the thickness of the carbon nanotube structure is small. In one embodiment, the light transmittance of the carbon nanotube structure achieves a range from 86 percent to 95 percent, if the thickness of the carbon nanotube structure ranges from about 0.5 nm to about 99 nm. If the carbon nanotube structure is composed of one or more carbon nanotube drawn films, the carbon nanotube structure has greater durability and strength because the carbon nanotube structure can be a freestanding structure composed of a plurality of carbon nanotubes joined by van der Waals attractive force. The first electrode 12 and the second electrode 14, composed of the carbon nanotube structure, have a high conductive property due to a high conductive property of the carbon nanotubes along the longitudinal direction, especially if the carbon nanotubes of the carbon nanotube structure are arranged along a same direction. The carbon nanotube structure has a high uniformity because the carbon nanotubes in the carbon nanotube structure are arranged along a substantially same direction. Thus, the FPPL has high stability and sensitivity.

The carbon nanotube structure can be adhered on the first surface 162 and the second surface 164 of the piezoelectric element 16 by conductive adhesive. The plurality of the carbon nanotubes in the carbon nanotube structure can be substantially parallel to the first surface 162 and the second surface 164 of the piezoelectric element 16. The carbon nanotube structure has a higher transparency than that of a prior art carbon nanotube layer having a same thickness and composed of a plurality of carbon nanotubes disorderly arranged, for the reason that the carbon nanotube has a much better light transmittance at a direction substantially perpendicular to a length direction of the carbon nanotube than at a direction substantially parallel to the length direction of the carbon nanotube. Therefore, if all the carbon nanotubes are substantially parallel to a surface of the carbon nanotube structure and oriented along a substantially same direction, the carbon nanotube structure has a good transparent appearance. In the carbon nanotube structure, the carbon nanotubes have good flexibility and are bendable, the carbon nanotubes are arranged substantially along a same direction, and the adjacent carbon nanotubes are joined by van der Waals attractive force therebetween. Further, at relatively low temperatures, the fabricated carbon nanotube structure can be attached onto the piezoelectric element. Thus, the formation of the electrodes on the piezoelectric element does not affect the piezoelectric property of the piezoelectric element. The fabricating process of the carbon nanotube structure is simple. Thus, the FPPL 10 is suitable for industrialization.

Figure 4A:
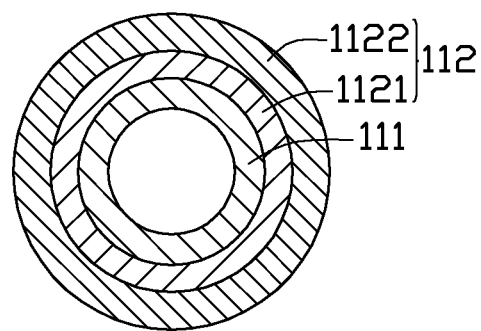
FIG. 4 is a structural schematic cross-sectional view of a carbon nanotube coated with a conductive metal layer.
Figure 4B:
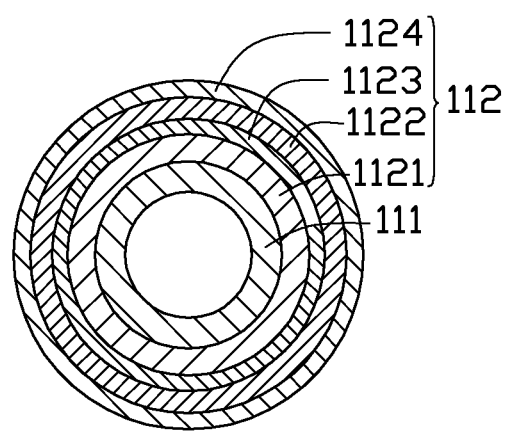
Figure 5:
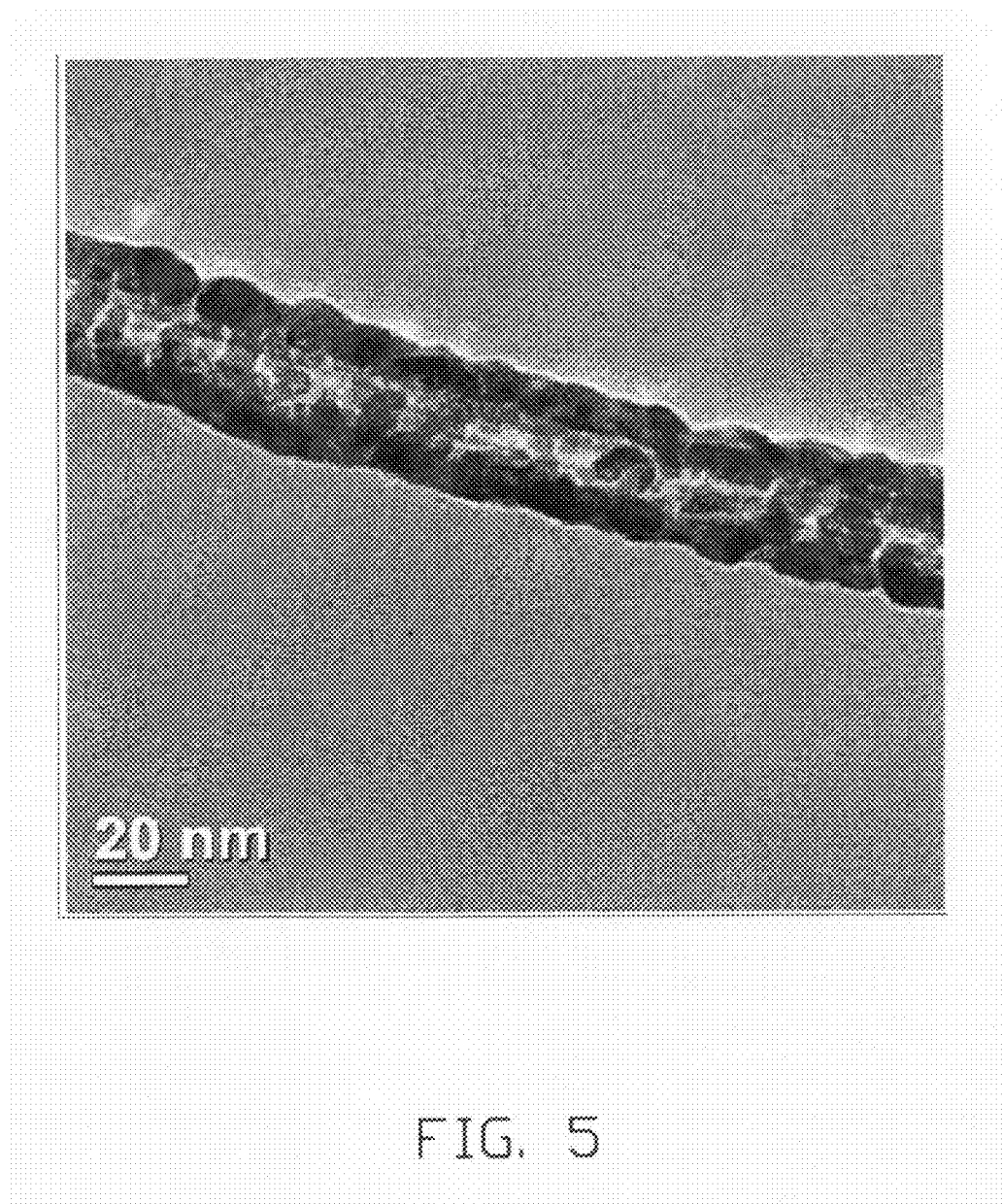
FIG. 5 is a Transmission Electron Microscope (TEM) image of the carbon nanotube coated with the conductive metal layer of FIG. 4.

Referring to FIGS. 4 and 5, the carbon nanotube structure comprises a plurality of carbon nanotubes 111. At least one conductive metal layer 112 can cover the carbon nanotubes 111. The material of the conductive metal layer 112 can consist of iron (Fe), cobalt (Co), nickel (Ni), palladium (Pd), titanium (Ti), or any combination alloy thereof. The thickness of the conductive metal layer 112 can range from about 1 nm to about 100 nm. In one embodiment, the thickness of the conductive metal layer 112 is below 20 nm. Furthermore, as shown in FIG. 4A, at least one conductive metal layer 112 may include a wetting layer 1121 applied to the outer circumferential surface of the carbon nanotube 111, and a conductive layer 1122 wrapping the outer circumferential surface of the wetting layer 1121. Wettability between carbon nanotubes and most kinds of metal is poor. Therefore, the wetting layer 1121 can be configured to provide a good transition between the carbon nanotube 111 and the conductive layer 1122. The wetting layer 1121 can consist of iron (Fe), cobalt (Co), nickel (Ni), palladium (Pd), titanium (Ti), or any combination alloy thereof. In one embodiment, the material of the wetting layer 1121 is nickel (Ni), the thickness of the wetting layer 1121 is 2 nm, the material of the conductive layer 1122 is gold (Au), the thickness of the conductive layer 1122 is 15 nm.

Furthermore, as shown in FIG. 4B, at least one conductive metal layer 112 can further include a transition layer 1123 covering the outer circumferential surface of the wetting layer 1121 and an anti-oxidation layer 1124 covering the outer circumferential surface of the conductive layer 1122. The transition layer 1123 is arranged for combining the wetting layer 1121 with the conductive layer 1122. The material of the transition layer 1123 should be one that combines well both with the material of the wetting layer 1121 and the material of the conductive layer 1122. Materials such as copper (Cu), silver (Ag), or alloys thereof can be used for the conductive layer 1122. The anti-oxidation layer 1124 is configured for preventing the conductive layer 1122 from being oxidized from exposure to the air and preventing reduction of the conductivity of the carbon nanotube.

At least one conductive metal layer 112 can be covered on the surface of the carbon nanotubes 111 in the carbon nanotube structure using evaporate plating technology, sputtering technology, deposition method, or electroplating technology. If the carbon nanotube structure includes a plurality of stacked carbon nanotube films, firstly, the conductive metal layer 112 can be separately covered on the surface of carbon nanotubes 111 of each carbon nanotube film, thereby forming a plurality of composite carbon nanotube films. Subsequently, the plurality of composite carbon nanotube films are stacked together. The corresponding resistances of the carbon nanotubes 111 wrapped with different conductive metal layers 112 are shown in Table 1. As shown in Table 1, due to the conductive coating outside the carbon nanotubes 111 in the carbon nanotube structure, the resistance of the carbon nanotube structure is decreased, thereby improving the conductivity of the first electrode 12 and the second electrode 14.

TABLE 1

| No. | Wetting layer/Thickness | Conductive layer/Thickness | Resistance (Ohms per square) |
| --- | --- | --- | --- |
| 1 | — | — | 1684 |
| 2 | Ni/2 nm | — | 1656 |
| 3 | Ni/2 nm | Au/3 nm | 504 |

According to converse piezoelectric effect, the piezoelectric element 16 can have an elastic deformation following an audio signal inputted to the piezoelectric element 16 by the first electrode 12 and the second electrode 14. The audio signal is introduced from an audio signal input device 18. In one embodiment, the first electrode 12 and the second electrode 14 are comprised of the carbon nanotubes 111 having flexibility, thus, the first electrode 12 and the second electrode 14 can vibrate corresponding to the elastic deformation of the piezoelectric element 16, thereby producing sound by vibration of ambient air.

Figure 6:
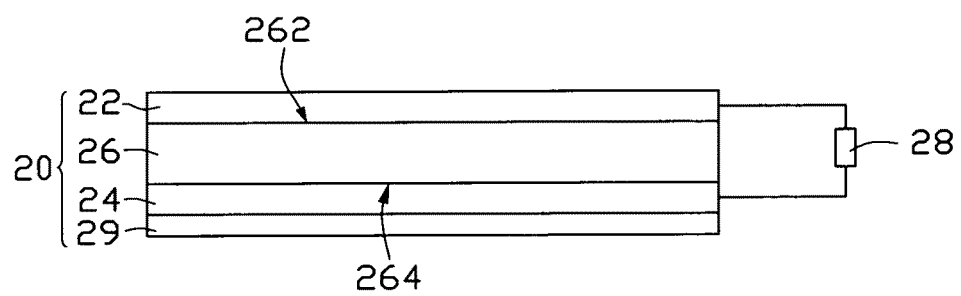
FIG. 6 is structural schematic view of another embodiment of a FPPL.

Referring to FIG. 6, one embodiment of a FPPL 20 includes a piezoelectric element 26, a first electrode 22, and a second electrode 24. The piezoelectric element 26 includes a first surface 262 and a second surface 264 opposite to the first surface 262. The first electrode 22 is electrically connected to the piezoelectric element 26 and disposed on the first surface 262. The second electrode 24 is electrically connected to the piezoelectric element 26 and disposed on the second surface 264.

Further, the FPPL 20 includes a diaphragm 29. The diaphragm 29 can be adhered on the surface of the first electrode 22 or the surface of the second electrode 24 by a conventional adhesive.

The diaphragm 29 can comprise resin, paper, metal material, and so on. The thickness of the diaphragm 29 is not limited, so long as the vibration of the piezoelectric element 26 is able to drive the diaphragm 29 to vibrate, thereby driving the air to vibrate and producing sound.

The working process of the FPPL 20 includes the following steps. An audio signal is input to the piezoelectric element 26 by the first electrode 22 and a second electrode 24. The audio signal is introduced from the audio signal input to the device 28, thus, the piezoelectric element 26 vibrates under the influence of converse piezoelectric effect. The vibration of the diaphragm 29 is driven by the vibration of the piezoelectric element 26, thereby producing sound by vibration of ambient air.

The vibration of the diaphragm 29 of the FPPL 20 can make a sound without a magnetic system or a coil of the conventional loudspeaker.

The first electrode and the second electrode of the FPPL include the carbon nanotube structure. The carbon nanotube structure includes a plurality of carbon nanotubes arranged substantially along a same direction. The carbon nanotubes have a good conductive property along the length of the carbon nanotubes, thus, the first electrode and the second electrode composed of the carbon nanotubes will also have a good conductive property. Thus, the FPPL has a high sensitivity and a good stability. The carbon nanotube structure can be a free-standing structure, thus, the first electrode and the second electrode have a high strength, thereby prolonging the useful life of the FPPL. The carbon nanotube structure has a good light transmittance at a direction substantially perpendicular to a length direction of the carbon nanotubes, thus, the carbon nanotube structure has high transparency. A conductive metal layer is covered on the surface of the carbon nanotubes, thereby improving the conductive property of the first electrode and the second electrode of the FPPL.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A flat panel piezoelectric loudspeaker (FPPL) comprising:
    a piezoelectric element comprising a first surface and a second surface opposite to the first surface;
    a first electrode electrically connected to the piezoelectric element and disposed on the first surface;
    a second electrode electrically connected to the piezoelectric element and disposed on the second surface; and
    wherein at least one of the first electrode and the second electrode comprises a carbon nanotube structure, the carbon nanotube structure comprising a plurality of carbon nanotubes approximately aligned along a same direction, a wetting layer applied to an outer circumferential surface of each of the plurality of carbon nanotubes, a conductive layer wrapping an outer circumferential surface of the wetting layer, and a transition layer between the wetting layer and the conductive layer, wherein a material of the transition layer is selected from the group consisting of copper, silver, and alloys thereof.

2. The FPPL as claimed in claim 1, wherein the plurality of carbon nanotubes in the first electrode is substantially parallel to the first surface of the piezoelectric element.

3. The FPPL as claimed in claim 1, wherein the plurality of carbon nanotubes in the second electrode is substantially parallel to the second surface of the piezoelectric element.

4. The FPPL as claimed in claim 1, wherein the carbon nanotube structure comprises at least one carbon nanotube film.

5. The FPPL as claimed in claim 4, wherein the at least one carbon nanotube film comprises a plurality of successive and oriented carbon nanotubes joined end to end by van der Waals attractive force.

6. The FPPL as claimed in claim 4, wherein the at least one carbon nanotube film comprises a plurality of carbon nanotubes substantially parallel to each other.

7. The FPPL as claimed in claim 1, wherein the first electrode is adhered on the first surface of the piezoelectric element, and the second electrode is adhered on the second surface of the piezoelectric element.

8. The FPPL as claimed in claim 1, wherein the piezoelectric element is made of polyvinylidene fluoride, polyvinyl fluoride, or polyvinyl chloride.

9. The FPPL as claimed in claim 1, wherein the wetting layer comprises a material, and the material is selected from the group consisting of iron, cobalt, nickel, palladium, titanium, and any combination alloy thereof; and a material of the conductive layer is gold.

10. The FPPL as claimed in claim 9, wherein the wetting layer is nickel layer with a thickness of about 2 nm; and the conductive layer is gold layer with a thickness of about 3 nm.

11. The FPPL as claimed in claim 1, wherein the carbon nanotube structure further comprises an anti-oxidation layer covering an outer circumferential surface of the conductive layer.

12. An FPPL comprising:
    a piezoelectric element comprising a first surface and a second surface opposite to the first surface;
    a first electrode electrically connected to the piezoelectric element and disposed on the first surface;
    a second electrode electrically connected to the piezoelectric element and disposed on the second surface; and
    a diaphragm disposed on a surface of the first electrode or a surface of the second electrode; wherein at least one of the first electrode and the second electrode comprises a carbon nanotube structure, the carbon nanotube structure comprising a plurality of carbon nanotubes approximately aligned along a same direction, a wetting layer applied to an outer circumferential surface of each of the plurality of carbon nanotubes, a conductive layer wrapping an outer circumferential surface of the wetting layer, and a transition layer between the wetting layer and the conductive layer, wherein a material of the transition layer is selected from the group consisting of copper, silver, and alloys thereof.

13. The FPPL as claimed in claim 12, wherein the diaphragm is adhered on the surface of the first electrode or the surface the second electrode by adhesive.

14. The FPPL as claimed in claim 12, wherein the diaphragm is made of resin, paper, or metal.

15. The FPPL as claimed in claim 12, wherein the carbon nanotubes are joined end to end by van der Walls attractive force.

16. The FPPL as claimed in claim 12, wherein the wetting layer comprises a material, and the material is selected from the group consisting of iron, cobalt, nickel, palladium, titanium, and any combination alloy thereof; and a material of the conductive layer comprises gold.

17. The FPPL as claimed in claim 16, wherein the wetting layer is nickel layer with a thickness of about 2 nm; and the conductive layer is gold layer with a thickness of about 3 nm.

18. The FPPL as claimed in claim 12, wherein the carbon nanotube structure further comprises an anti-oxidation layer covering an outer circumferential surface of the conductive layer.

19. A flat panel piezoelectric loudspeaker (FPPL) comprising:
a piezoelectric element comprising a first surface and a second surface opposite to the first surface;
a first electrode electrically connected to the piezoelectric element and disposed on the first surface;
a second electrode electrically connected to the piezoelectric element and disposed on the second surface; and
wherein at least one of the first electrode and the second electrode comprises a carbon nanotube structure, the carbon nanotube structure comprising a plurality of carbon nanotubes approximately aligned along a same direction, a wetting layer applied to an outer circumferential surface of each of the plurality of carbon nanotubes, a conductive layer wrapping an outer circumferential surface of the wetting layer, and an anti-oxidation layer covering an outer circumferential surface of the conductive layer.

* * * * *